(12) United States Patent
Hallikainen

(10) Patent No.: US 12,189,407 B2
(45) Date of Patent: Jan. 7, 2025

(54) DC VOLTAGE REGULATOR FOR LOW-POWER DEVICE

(71) Applicant: Nordic Semiconductor ASA, Trondheim (NO)

(72) Inventor: Samuli Hallikainen, Oulu (FI)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 234 days.

(21) Appl. No.: 17/729,903

(22) Filed: Apr. 26, 2022

(65) Prior Publication Data

US 2022/0350355 A1    Nov. 3, 2022

(30) Foreign Application Priority Data

Apr. 28, 2021 (FI) ...................... 20215492

(51) Int. Cl.
*G05F 1/56* (2006.01)
(52) U.S. Cl.
CPC ...................... *G05F 1/56* (2013.01)
(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575;
H02M 5/2573; H02M 1/081; H02M 5/293; H02M 7/12; H02M 3/10; H02M 3/125; H02M 3/13; H02M 3/135;
(Continued)

(56) References Cited

U.S. PATENT DOCUMENTS 7,372,241 B1   5/2008 Tomiyoshi
9,350,326 B2 * 5/2016 Tang ..................... H03K 5/24
(Continued)

FOREIGN PATENT DOCUMENTS

CN        109656292        4/2019

OTHER PUBLICATIONS

Finnish Search Report for FI U.S. Appl. No. 20/215,492, dated Nov. 30, 2021, 2 pages.
(Continued)

*Primary Examiner* — Jeffrey A Gblende
(74) *Attorney, Agent, or Firm* — Nixon & Vanderhye PC

(57) ABSTRACT

This document describes a solution for low-power voltage regulation. According to an aspect, there is provided an apparatus comprising: a supply voltage regulator circuit configured to regulate a power supply voltage of a circuit; a comparator circuit coupled to the power supply voltage and configured to sample the power supply voltage, to compare the sampled power supply voltage with a reference voltage and, if the sampled power supply voltage is below the reference voltage, to enable the supply voltage regulator circuit to charge the power supply voltage, wherein the comparator is switched on and off in response to a clock signal; and a clock signal generator circuit configured to generate the clock signal.

10 Claims, 4 Drawing Sheets

(58) Field of Classification Search
CPC ........ H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H05B 39/048; B23K 11/24; H04B 2215/069
See application file for complete search history.

(56) References Cited

U.S. PATENT DOCUMENTS

| | | | |
|---|---|---|---|
| 11,101,638 B2* | 8/2021 | Nadig | H01L 23/34 |
| 11,294,443 B1* | 4/2022 | Savoj | G01K 7/32 |
| 2007/0025163 A1* | 2/2007 | Partsch | G11C 5/147 |
| | | | 365/189.09 |
| 2016/0204704 A1 | 7/2016 | Cao | |
| 2023/0353037 A1* | 11/2023 | Zhao | H02M 1/0041 |

OTHER PUBLICATIONS

Kundu et al. A Fully Integrated Digital LDO with Built-In Adaptive Sampling and Active Voltage Positioning using a Beat-Frequency Quantizer. In: IEEE Journal of Solid State Circuits 201901, vol. 54, No. 1, Jan. 1, 2019, pp. 109-120.

* cited by examiner

DC VOLTAGE REGULATOR FOR LOW-POWER DEVICE

This application claims priority to FI 20215492 filed Apr. 28, 2021, the entire contents of which are hereby incorporated by reference.

TECHNICAL FIELD

Embodiments described herein relate to a direct current voltage regulator in a low-power device.

BACKGROUND

Low-power devices such as battery-powered radio devices call for low power consumption. The power supply as well components in the power supply should also operate in a power-efficient manner. A voltage regulator is conventionally used to regulate a power supply voltage supplying a circuit, e.g. a digital circuit, analog circuit or a combination of analog and digital circuits. A need for the regulation may be caused by power leakage in the circuit, for example. Stable power supply is needed for the designed and efficient operation of the circuit. Even in a power-save mode of the circuit, it is advantageous to regulate the power supply voltage so that the power supply voltage is readily available when the circuit wakes up to an active mode. However, the regulation should have low power consumption.

BRIEF DESCRIPTION

According to an aspect, there is provided an apparatus comprising: a supply voltage regulator circuit configured to regulate a power supply voltage of a circuit; a comparator circuit coupled to the power supply voltage and configured to sample the power supply voltage, to compare the sampled power supply voltage with a reference voltage and, if the sampled power supply voltage is below the reference voltage, to enable the supply voltage regulator circuit to charge the power supply voltage, wherein the comparator is switched on and off in response to a clock signal; and a clock signal generator circuit configured to generate the clock signal. A technical effect is that the regulator is switched on only on a need basis, thus reducing power consumption.

In an embodiment, the clock signal generator circuit is configured to output the clock signal and, thereby, switch the comparator circuit on and off only in a power-save mode of the circuit. As a consequence, very low power consumption can be achieved in the power-save mode.

In an embodiment, the comparator circuit is continuously on in an active mode of the circuit. As a consequence, the power supply voltage is maintained accurately on a desired level in the active mode.

In an embodiment, the clock signal generator circuit comprises means for changing a frequency of the clock signal in response to operational conditions of the circuit. As a consequence, the sampling the power supply voltage for determining the need for regulation can be adapted to the varying operational conditions of the circuit.

In an embodiment, the means for changing the frequency comprise a dummy circuit emulating the circuit and following operational behavior of the circuit and, thereby, changing the frequency in response to a change in the operational conditions. The dummy circuit emulating the circuit supplied by the power supply voltage enables accurate adaptation to the varying operational conditions.

In an embodiment, power leakage in the dummy circuit is configured to correlate with power leakage in the circuit. Power leakage is a feature causing the need for the regulation, and the dummy circuit emulating the power leakage of the circuit enables accurate adaptation to the varying operational conditions.

In an embodiment, the operational conditions comprise temperature-dependent behavior of the circuit. Temperature is a feature affecting the need for the regulation, and adapting the sampling according to the temperature variations improves the performance of the regulation.

In an embodiment, the apparatus further comprises a reference voltage generator circuit, coupled to receive the clock signal as an input, and configured when enabled by the clock signal to generate a reference current defining the reference voltage and, further, to generate an enablement signal enabling the comparator circuit to sample the power supply voltage. Further power savings can be achieved when the reference voltage generation is also switched on and off.

In an embodiment, the reference voltage generator circuit is configured to generate the enablement signal after the reference current has settled. Therefore, accurate comparison can be achieved.

In an embodiment, the enablement signal is a clock signal.

In an embodiment, the supply voltage regulator is configured to stop charging the power supply voltage upon expiry of a timer. The timer provides a simple and reliable solution for controlling the amount of charging.

In an embodiment, the clock signal generator circuit is operated by a nanoampere level bias current. As a consequence, the power consumption is very low.

In an embodiment, if the sampled power supply voltage is above the reference voltage, the comparator circuit is configured not to enable the supply voltage regulator circuit to charge the power supply voltage. As a consequence, the regulation is triggered only when it is actually needed, thus causing power savings.

In an embodiment, a periodicity of the clock signal is between 0.1 and 100 milliseconds. Accordingly, the sampling frequency is very low, enabling high power savings.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
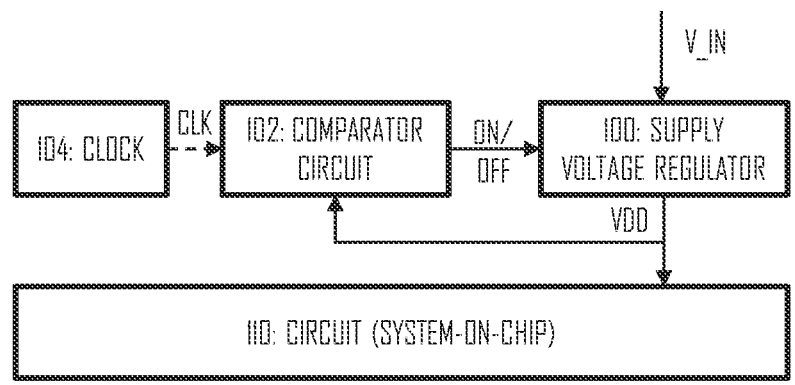
FIG. 1 illustrates an embodiment of an apparatus for voltage regulation.

FIG. 1 illustrates an apparatus comprising a supply voltage regulator circuit 100 configured to regulate a power supply voltage VDD of a circuit 110. The apparatus comprises a comparator circuit 102 coupled to the power supply voltage VDD and configured to sample the power supply voltage VDD, to compare the sampled power supply voltage with a reference voltage VREF and, if the sampled power supply voltage is below the reference voltage, to enable the supply voltage regulator circuit 100 to charge the power supply voltage VDD. The comparator is switched on and off in response to a clock signal CLK generated by a clock signal generator circuit 104 of the apparatus.

The above-described apparatus provides supply voltage regulation with low power consumption. The low power consumption is acquired by enabling the regulation only on a need basis, thereby allowing the power supply regulator to switch off and reduce power consumption. Furthermore, the determination of whether or not the regulation is needed is switched on and off according to the clock signal. Therefore, further power-savings can be achieved because the comparator circuit 102 may also be switched off intermittently.

The circuit 110 may be any analogue or digital circuit (or a hybrid thereof), having a determined application or purpose. The digital circuit may comprise digital logic gates implementing one or more designed functionalities. The same applies to analogue circuit where a certain arrangement of analogue electronic components implement a dedicated task. The circuit may form a system-on-chip (SoC). Examples of such SoCs include a radio modem, an application-specific signal processor, a baseband signal processor, a radio frequency signal processor, and a microcontroller.

The above-described regulation with low power consumption is particularly advantageous in a power-save mode of the circuit 110. In an embodiment, the clock signal generator circuit 104 is configured to output the clock signal and, thereby, switch the comparator circuit 102 on and off only in a power-save mode of the circuit. In an active mode of the circuit 110, the comparator circuit may be continuously switched on. The comparator circuit may be always-on and continuously sample the power supply voltage VDD for continuous regulation. A controller responsive to the mode of the circuit may be provided to control the clock signal generator. Upon detecting that the circuit enters from the active mode to the power-save mode, the controller may enable the clock signal generator 104 to output the clock signal to cause the intermittent sampling of the power supply voltage by the comparator circuit 102. Upon detecting that the circuit enters the active mode, the controller may configure the clock signal generator 104 to output an always-on signal to cause the continuous sampling of the power supply voltage by the comparator circuit 102.

Figure 2:
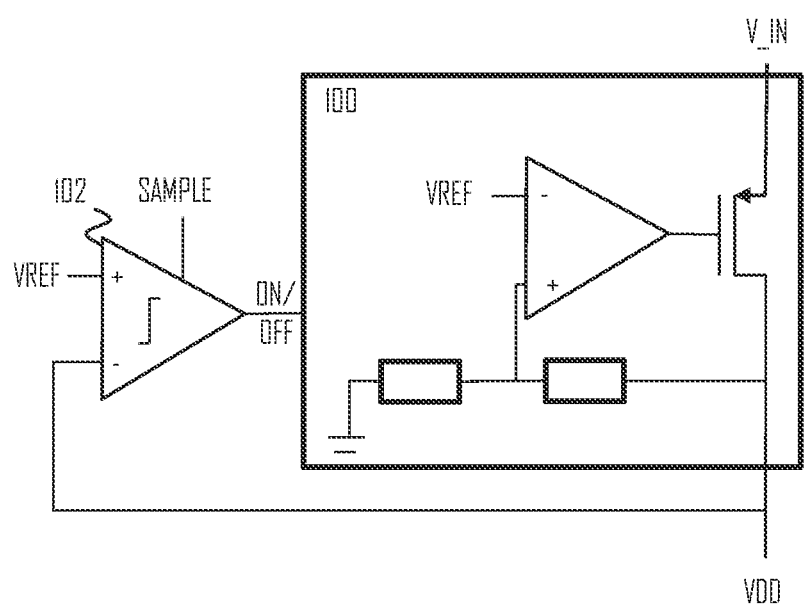
FIG. 2 illustrates an embodiment of a supply voltage regulator and a comparator.

FIG. 2 illustrates the supply voltage regulator circuit 100 and the comparator circuit 102 in greater detail. The supply voltage regulator circuit 100 may be a conventional direct current (DC) voltage regulator designed for ultra-low power solutions. For example, a low-dropout (LDO) regulator or another linear voltage regulator. In another embodiment, a switching regulator is used as the power supply regulator. In the embodiment illustrated in FIG. 2, the LDO regulator is used. V_IN represents an input voltage the regulator uses to charge the power supply voltage VDD. As illustrated in FIG. 2, the power supply regulator 100 is switched on and off in response to an output of the comparator 102. The comparator on the other hand, is switched on and off in response to an enablement signal SAMPLE that is responsive to the clock signal CLK. Embodiments of the relation between the signals CLK and SAMPLE are described below. Furthermore, a reference voltage VREF input to the comparator 102 may be responsive to the clock signal CLK so that the reference voltage is applied only when the enablement signal SAMPLE enables the comparator to sample the power supply voltage VDD. In another embodiment, the reference voltage VREF is continuously available which would have an advantage of avoiding the need for the reference voltage to become available for sampling (see the description below). On the other hand, making the reference voltage also responsive to the clock signal CLK would provide greater power savings. Even in the case where the reference voltage VREF is responsive to the clock signal CLK, if the reference voltage VREF is at the input of the comparator 102 for the whole duration where the comparator 102 is enabled, the reference voltage VREF can be understood as statically available to the comparator 102. When the power supply voltage VDD is below the reference voltage VREF, the comparator may switch the regulator 100 on, and the regulator 100 may start charging the power supply voltage VDD. On the other hand, when the sampled power supply voltage VDD is above the reference voltage VREF, the comparator may refrain from enabling the regulator 100. As a consequence, the charging is omitted when it is not needed, and power-savings can be achieved.

The reference voltage VREF may further be applied to one of the inputs of an operational amplifier of the regulator 100, as illustrated in FIG. 2.

The supply voltage regulator is configured to charge the power supply voltage VDD for a determined time interval. A timer may be triggered by the activation of the regulator 100 and, upon expiry of the timer, the regulator 100 may be switched off, until again switched on by the comparator 102. In another embodiment, the comparator circuit 102 or another comparator circuit may be used to detect when the power supply voltage is at a threshold level and, in response to the detection, the regulator is switched off until again enabled by the comparator circuit 102.

The clock signal generator may be biased by a nanoampere level bias current, e.g. less than 20 nanoamperes. For example, a bias current of ten (10) nanoamperes may be sufficient.

In an embodiment, the apparatus further comprises a bandgap circuit, coupled to receive the clock signal CLK as an input. The bandgap circuit is configured, when enabled by the clock signal CLK, to generate a reference current I_REF defining the reference voltage VREF and, further, to generate the enablement signal SAMPLE enabling the comparator circuit 102 to sample the power supply voltage. The bandgap circuit is a conventional circuit used to provide a reference voltage that is conventionally temperature-independent. The literature teaches various designs for the bandgap circuit. However, another circuit may be used to provide the reference voltage and the enablement signal in response to the clock signal CLK.

Figure 3:
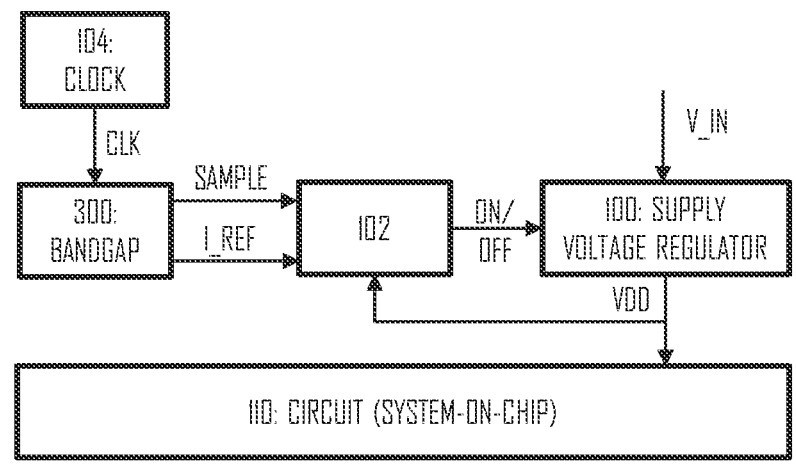
FIG. 3 illustrates a detailed embodiment of the apparatus of FIG. 1.

FIG. 3 illustrates the inter-relation between the clock signal CLK and the enablement signal SAMPLE by using the bandgap circuit 300. As described above, the clock signal CLK intermittently enables the bandgap circuit to generate the enablement signal SAMPLE and the reference current I_REF to intermittently wake up the comparator circuit 102 to sample the power supply voltage. Accordingly, the enablement signal may also be a clock signal. The periodicity or frequency of the clock signal CLK and the enablement signal SAMPLE may be the same, but the duty cycles may differ, as described below. The periodicity of the clock signal and the enablement signal may be between 1 and 10 milliseconds, or even between 0.1 and 100 milliseconds. The periodicity may be variable, as described below. The variation may be between the 1 and 10 milliseconds or 0.1 and 100 milliseconds, for example.

Figure 4:
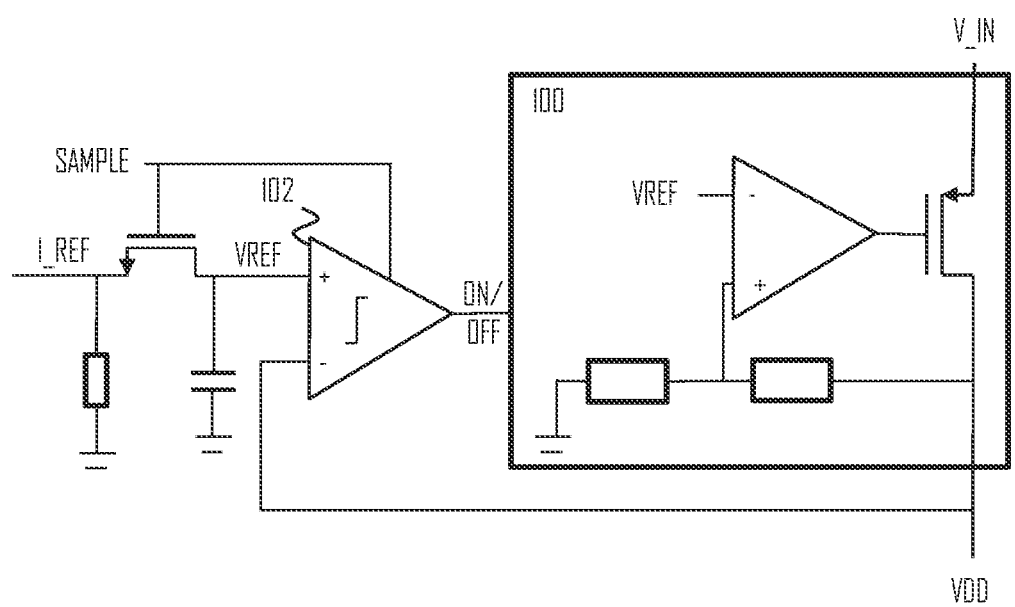
FIG. 4 illustrates a detailed embodiment of the circuit of FIG. 2.

FIG. 4 illustrates a more detailed circuit diagram for the comparator circuit and how the reference current I_REF and the enablement signal SAMPLE are applied to the comparator circuit 102. The reference voltage VREF may be set by matching components at a reference voltage input of the comparator 102. FIG. 4 illustrates a resistor and a capacitor at the input, and the impedances may be selected to bring the reference voltage VREF to a desired level. The reference current may be delivered through a switch having its gate controlled by the enablement signal SAMPLE. As a consequence, the enablement signal SAMPLE both enables the comparator to carry out the sampling and the comparison and, additionally, opens the switch to deliver the reference voltage VREF to the other input of the comparator 102. The matching components at the input may be considered to be a part of the comparator circuit or separated therefrom.

Figure 5:
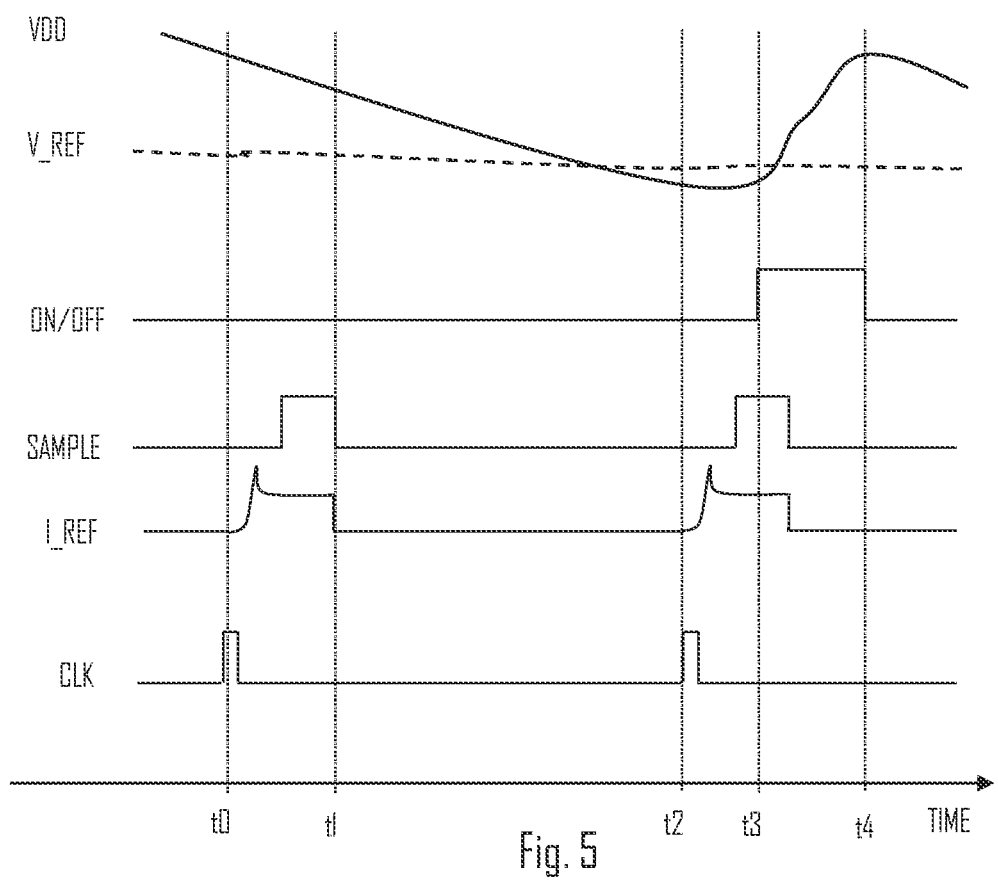
FIG. 5 illustrates a timing diagram describing operation of the circuit of FIG. 4.

Let us then describe operation of the apparatus of FIG. 4 with reference to a timing diagram of FIG. 5. In the illustrated timing diagram, the reference voltage Vref is constantly available (substantially static). The signals described above are illustrated on the same timeline in FIG. 5. Because of power leakage in the circuit, the power supply voltage VDD may decline, as illustrated in FIG. 5. Let us start with the clock signal CLK. When the clock signal goes high, it triggers the bandgap circuit to generate the reference current I_REF. Immediately after triggering the bandgap circuit, the clock signal may go low, as illustrated in FIG. 5. Conventionally, I_REF does not immediately stabilize but there is a ramp-up delay followed by a peak before it stabilizes, as illustrated in FIG. 5. Accordingly, it takes some time for I_REF to settle. The bandgap circuit may be configured to maintain the enablement signal SAMPLE low until I_REF has stabilized and, upon the reference current has settled, the enablement signal SAMPLE may be output. As described above, the output of the enablement signal causes sampling of the power supply voltage VDD. As illustrated on the left hand side of FIG. 5, the power supply voltage VDD is still above the reference voltage VREF. As a consequence, the comparator will not switch the power supply regulator on at this stage. When the clock signal CLK goes high the next time at t2, the bandgap circuit will charge the reference current I_REF again and, upon the reference current I_REF has settled at t3, the bandgap circuit switches the comparator on to sample the power supply voltage VDD. At this stage, the power supply voltage is below the reference voltage, as illustrated in FIG. 5 and therefore the comparator switches the supply voltage regulator on to charge the power supply voltage. As a consequence, the power supply voltage VDD starts to increase. After the determined time interval, the power supply regulator is switched off, and the power supply voltage starts decreasing again.

As illustrated in FIG. 5, at least some cycles of the clock signal may pass without switching the power supply regulator on. In an embodiment, the frequency of the clock signal is selected such that there are at least some cycles of the clock signal that will not switch the regulator on. In such a case, the frequency may be considered sufficient to guarantee that the power supply voltage is regulated appropriately. If every cycle would trigger charging the power supply voltage, it would be an indicator that the regulation does not necessarily operate in an optimal manner. On the other hand, if numerous consecutive cycles will not activate the regulator to charge the power supply voltage, it would be an indicator that the frequency may be too high and cause unnecessary power consumption. By appropriately selecting the frequency of the clock signal, both improved power-efficiency and appropriate regulation may be achieved.

Duration of a cycle of the clock signal CLK, i.e. a time interval between t0 and t2 may be five milliseconds, for example. A time interval between t1 and t0 may be in the order of 2-3 microseconds, and the ON time of the regulator (t4-t3) may be five microseconds, for example. With this solution, the average current consumption of the regulation (counted over several charging cycles) can be kept even at a level of a few nanoamperes, including the regulator 100, the comparator 102, and the bandgap circuit 300 of FIG. 3. The clock signal generator and the bias current may be omitted, e.g. if they are coupled also to the circuit 110 to provide a voltage/current or clock for other purposes in the circuit as well. An example of such another purpose is maintaining at least a part of the circuit 110 powered even in the power-save mode. Such a part may comprise a wake-up detector or some features of the circuit 110 that are always on.

As described above, power leakage is one characteristic that causes the need for the regulation of the power supply voltage. The amount of power leakage may be a function of temperature of the circuit and/or design of the circuit. The design may refer to how the digital logic gates are arranged in the circuit, i.e. the physical structure of the circuit. Other operational conditions may also affect the amount of power leakage in the circuit and/or another characteristic of the circuit that causes the need for the power supply voltage regulation. In an embodiment, the clock signal generator circuit comprises means for changing the frequency of the clock signal in response to such operational conditions of the circuit. The clock signal generator may be configured to change the frequency of the clock signal CLK in response to a change in a temperature of the circuit or the clock signal generator. The clock signal generator and the circuit may be implemented in the same circuit so they may experience the same temperature conditions.

In an embodiment, the clock signal generator comprises a circuit emulating the circuit and following operational behaviour of the circuit and, thereby, changing the frequency of the clock signal CLK in response to a change in the operational conditions. The circuit may be a dummy circuit that has no other purpose than to emulate the operational behaviour of the circuit, e.g. temperature-dependent power leakage of the circuit. When the power leakage in the dummy circuit is configured to correlate with the power leakage in the circuit, the oscillation frequency becomes correlated with the power leakage, which again determines the need for charging the power supply current. Accordingly, the sampling frequency of the power supply voltage becomes correlated with the need for charging the power supply current.

Figure 6:
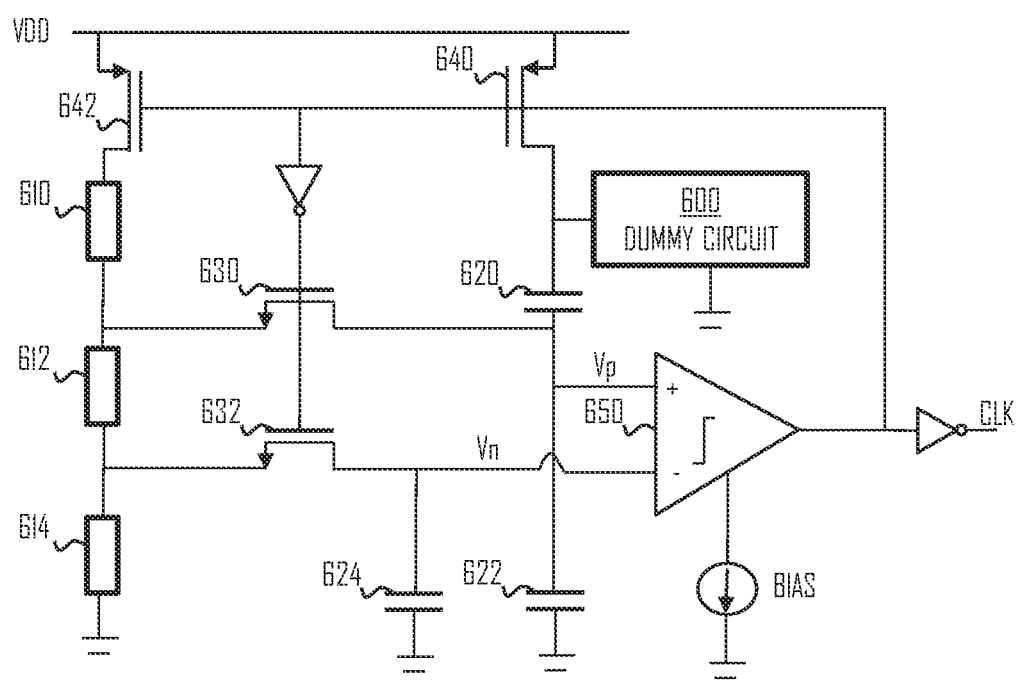
FIG. 6 illustrates an embodiment of a clock signal generator.

FIG. 6 illustrates an embodiment of the clock signal generator using the dummy circuit 600 to generate the clock signal CLK. As described above, the clock signal generator may be driven with the nanoampere level bias current BIAS. The bias current may drive a comparator 650 that may be always on, when the clock signal generator is enabled. The comparator 650 has two inputs Vp and Vn, and the output of the comparator is responsive to the comparison between Vp and Vn. Vn defines a lower target voltage that is tuned by the capacitor 624 at the negative input to the comparator 650. Note that the capacitor 622 is not coupled to the negative input of the comparator. The capacitance of the capacitor 624 may be higher than the capacitance of the capacitor 622, e.g. at least by a decade. Therefore, the lower target voltage Vn is driven to a lower voltage level than the higher target voltage Vp. The comparator output is coupled to gates of two switches 640, 642 coupled to the power supply voltage VDD, as illustrated in FIG. 6. The switches 640, 642 may be of PMOS (P-channel metal oxide semiconductor field effect transistor) type. The dummy circuit is coupled to a collector of the switch that is coupled to the positive input of the comparator, via the capacitor 620. The capacitance of the capacitor 620 may be within the same decade as the capacitance of the capacitor 622, e.g. higher than the capacitance of the capacitor 622. The collector of the other switch 642 may be coupled to a resistor bridge formed by resistors 610, 612, 614. The output of the comparator 650 may be further coupled to gates of sampling switches 630, 632 via an inverter. The sampling switches set the target voltages Vn and Vp, as illustrated in FIG. 6. Emitters of the sampling switches 630, 632 may be coupled to the resistor bridge such that the emitter of the switch 630 is coupled between the resistors 610, 612 while the emitter of the switch 632 is coupled between the resistors 612, 614. The resistances of the resistors 610, 612, 614 may differ such that the resistances of the resistors 610, 612 may be a decade higher than the resistance of the resistor 612. For example, if the resistance of the resistor 612 is one ohm, the resistances of the resistor 610 and 614 may be ten and nine ohms, respectively. Examples of relative values of the capacitors and the resistors, respectively, can be found in the following table. Actual values may be selected according to the design.

| Component | Relative resistance/capacitance value |
| --- | --- |
| 610 | 10 |
| 612 | 1 |
| 614 | 9 |
| 620 | 2 |
| 622 | 1 |
| 6224 | 10 |

Let us then describe the operation of the clock signal generator of FIG. 6. When the comparator output rises, the resistor ladder and the dummy circuit will not be coupled, i.e. the switches 640, 642 are open. The sampling switches 630, 632 are also open, thereby causing the higher target voltage to leak to the dummy circuit 600 and decay. Some leakage may be directed through the sampling switch 630 as well. The lower target voltage Vn will also leak but at a slower rate because it is not coupled to the dummy circuit 600. When the higher target voltage Vp drops below the lower target voltage Vn, the comparator output will drop, thus closing the switches 630, 632, 640, 642 and coupling the power supply voltage VDD to the circuit. This will cause the higher target voltage Vp to rise, faster than the lower target voltage. When the higher target voltage Vp raises above the lower target voltage Vn, the comparator output rises again, starting another cycle. No hysteresis of the comparator 650 is considered in this simplified case. The output of the comparator may be arranged through an inverter to produce the clock signal CLK.

Embodiments described herein are applicable to systems defined above but also to other systems. The protocols used, the specifications of the systems and their elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
   a supply voltage regulator circuit configured to regulate a power supply voltage of a main circuit;
   a comparator circuit coupled to the power supply voltage and configured to sample the power supply voltage, to compare the sampled power supply voltage with a reference voltage and, if the sampled power supply voltage is below the reference voltage, to enable the supply voltage regulator circuit to charge the power supply voltage, wherein the comparator is switched on and off in response to a clock signal;
   a clock signal generator circuit configured to generate the clock signal; and
   a dummy circuit configured to emulate the main circuit and to follow operational behavior of the circuit and, thereby, cause the clock signal generator circuit to change a frequency in response to a change in operational conditions of the main circuit,
   wherein the clock signal generator circuit is configured to output the clock signal and, thereby, switch the comparator circuit on and off only in a power-save mode of the main circuit, and wherein the comparator circuit is continuously on in an active mode of the main circuit.

2. The apparatus of claim 1, wherein the dummy circuit is configured such that power leakage in the dummy circuit correlates with power leakage in the main circuit.

3. The apparatus of claim 1, wherein the operational conditions comprise temperature-dependent behavior of the main circuit.

4. The apparatus of claim 1, further comprising a reference voltage generator circuit, coupled to receive the clock signal as an input, and configured when enabled by the clock signal to generate a reference current defining the reference voltage and, further, to generate an enablement signal enabling the comparator circuit to sample the power supply voltage.

5. The apparatus of claim 4, wherein the reference voltage generator circuit is configured to generate the enablement signal after the reference current has settled.

6. The apparatus of claim 4, wherein the enablement signal is a clock signal.

7. The apparatus of claim 1, wherein the clock signal generator circuit is operated by a nanoampere level bias current.

8. The apparatus of claim 1, wherein if the sampled power supply voltage is above the reference voltage, the comparator circuit is configured not to enable the supply voltage regulator circuit to charge the power supply voltage.

9. The apparatus of claim 1, wherein a periodicity of the clock signal is between 0.1 and 100 milliseconds.

10. An apparatus comprising:
a supply voltage regulator circuit configured to regulate a power supply voltage of a main circuit;
a comparator circuit coupled to the power supply voltage and configured to sample the power supply voltage, to compare the sampled power supply voltage with a reference voltage and, if the sampled power supply voltage is below the reference voltage, to enable the supply voltage regulator circuit to charge the power supply voltage, wherein the comparator is switched on and off in response to a clock signal;
a clock signal generator circuit configured to generate the clock signal; and
a dummy circuit configured to emulate the main circuit and to follow operational behavior of the main circuit such that power leakage in the dummy circuit correlates with power leakage in the main circuit and, thereby, cause the clock signal generator circuit to change the frequency in response to a change in the operational conditions,
wherein the clock signal generator circuit is configured to output the clock signal and, thereby, switch the comparator circuit on and off only in a power-save mode of the main circuit, and wherein the comparator circuit is continuously on in an active mode of the main circuit.

* * * * *